United States Patent [19]

Yang

[11] 4,253,419

[45] Mar. 3, 1981

[54] MILK CLAW

[75] Inventor: Denis C. Yang, Irvington, N.Y.

[73] Assignee: The De Laval Separator Company, Poughkeepsie, N.Y.

[21] Appl. No.: 42,123

[22] Filed: May 24, 1979

[51] Int. Cl.³ .............................................. A01J 7/00
[52] U.S. Cl. ................................................. 119/14.54
[58] Field of Search .............. 119/14.54, 14.55, 14.08, 119/14.37, 14.36

[56] References Cited

U.S. PATENT DOCUMENTS

| | | | |
|---|---|---|---|
| 1,257,688 | 2/1918 | Forsyth | 119/14.37 |
| 3,111,933 | 11/1963 | Nordegren | 119/14.54 |
| 3,999,516 | 12/1976 | Shulick | 119/14.54 |

FOREIGN PATENT DOCUMENTS 1203681  9/1970  United Kingdom .................. 119/14.54

Primary Examiner—Jay N. Eskovitz
Attorney, Agent, or Firm—Cyrus S. Hapgood

[57] ABSTRACT

A milk claw includes upper and lower body portions forming a milk collecting chamber having a central vertical axis. Four inlet nozzles slant downwardly to said upper body portion while extending tangentially in one direction relative to said axis, whereby milk from these nozzles is caused to spin in said one direction about said axis as the milk descends in a spiral path in said chamber. A discharge nozzle opens into the lower part of the chamber at a region located in the spiral path of the spinning milk and discharges the milk tangentially from the chamber in the direction of said spin.

5 Claims, 3 Drawing Figures

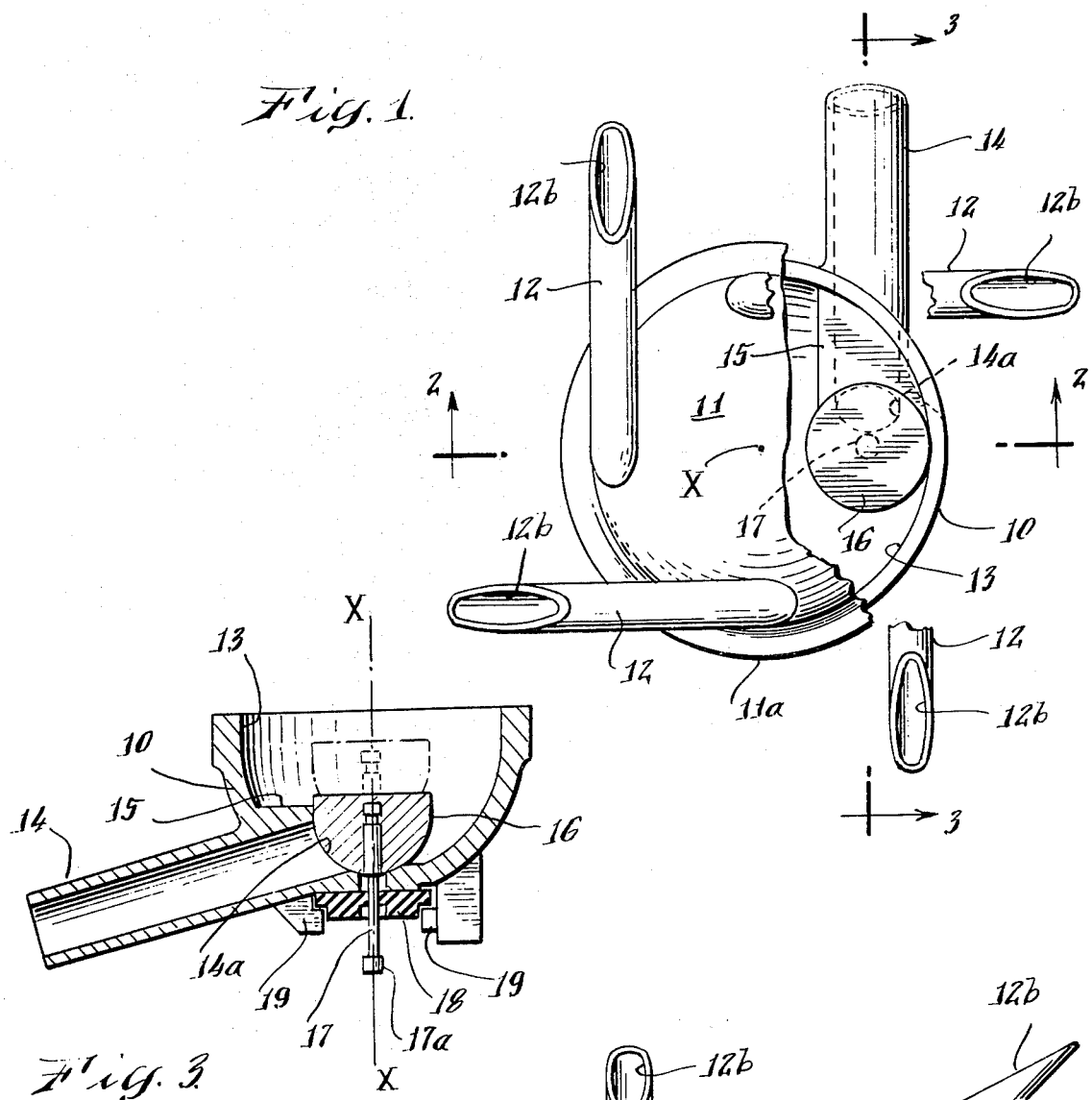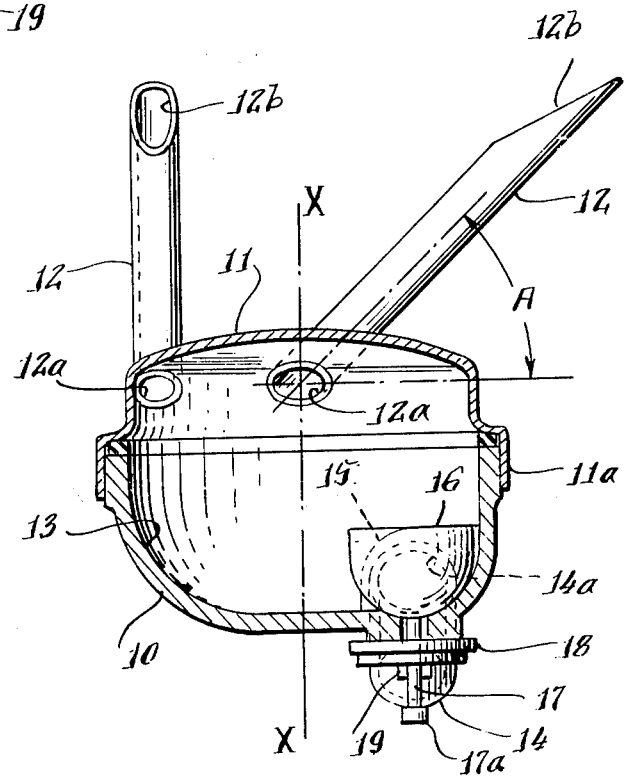

MILK CLAW

This invention relates to claws for milking machines and more particularly to a novel milk claw which is more efficient in operation than prior milk claws.

The milk claw is an important part of a milking machine. It is an enclosed vessel for collecting the milk from the teat cups and directing it into a long tube through which the milk flows to a desired destination.

Milk claws as commonly made heretofore comprise a hollow body having four protruding nipples or inlet nozzles adapted for connection to the milk tubes leading from respective teat cups of the milking machine. From these inlet nozzles, the four milk streams flow downwardly into the hollow body while converging radially toward the center of the body. The milk thus collected discharges through a nozzle located at the bottom of the hollow body.

These prior milk claws have the disadvantage that the milk streams entering the hollow body create considerable turbulence and splashing. As a result, the throughflow capacity of the milk claws is reduced and there is a strong aerosol effect which promotes the transmission of bacteria between teats.

The principal object of the present invention is to provide a milk claw which overcomes the above-noted disadvantage.

In a milk claw made according to the invention, the protruding inlet nozzles of the hollow body are located symmetrically around the center of the body and direct the milk flow downwardly and tangentially in relation to the center of the body. Due to this tangential arrangement of the inlet nozzles, the milk is caused to spin in one direction around the central vertical axis of the hollow body as it descends toward the discharge nozzle. The latter is arranged to discharge the milk tangentially from the hollow body in the same direction as the spin.

For a better understanding of the invention, reference may be had to the following detailed description in conjunction with the accompanying drawings, in which:

FIG. 1 is a plan view of a preferred form of the new milk claw, with part of the top of the hollow body broken away, and FIGS. 2 and 3 are sectional views on lines 2—2 and 3—3, respectively, in FIG. 1.

The milk claws as illustrated comprises a hollow body having a bowl-shaped lower portion 10 and a round upper portion formed by a cover 11. The latter has a depending flange 11a closely surrounding the bowl 10 and through which the cover is releasably secured to the bowl in any suitable manner. Four inlet nozzles or nipples 12 are secured in openings in the cover 11 and protrude therefrom for connection to respective teat cups (not shown) of the milking machine. The inner ends of the nozzles 12 form openings 12a into the milk collecting chamber 13 of the hollow body 10-11; and the outer ends of the nozzles are bevelled, as shown at 12b, so that they are more readily received in the milk tubes extending from the usual liners of the teat cups.

As shown in FIGS. 1 and 2, the four inlet nozzles 12 are located symmetrically around the central vertical axis X—X of the hollow body 10-11, and they slant downwardly to the cover 11 at an acute angle A of about 45% to the horizontal (FIG. 2). Also, instead of the nozzles having their axes converging toward the central axis X—X of the hollow body, the axes of diametrically opposed nozzles lie in respective vertical planes which are parallel to each other (FIG. 1).

Thus, the inlet nozzles 12 extend tangentially in relation to the central vertical axis X—X. Moreover, as these nozzles slant downwardly, they extend tangentially in the same direction relative to axis X—X (counterclockwise as shown in FIG. 1).

A milk discharge nozzle 14 extends outward and somewhat downward from the lower part of bowl 10 (FIG. 3). The inner part 15 of this nozzle projects into the milk collecting chamber 13, where it forms a milk outlet opening 14a located at the lower part of the chamber. As best shown in FIG. 1, the axis of outlet nozzle 14 lies in a vertical plane which is offset substantially from the chamber axis X—X and which is parallel to the vertical planes in which the axes of a pair of diametrically opposed inlet nozzles 12 lie.

It will be apparent, therefore, that the discharge nozzle 14 extends tangentially in relation to the central vertical axis X—X. Moreover, as shown in FIG. 1, it extends tangentially from collecting chamber 13 in the counterclockwise direction.

At the outlet opening 14a, the inner part 15 of the discharge nozzle forms a seat for a float valve 16. The latter has a stem extending downward through the bottom of bowl 10 and through a sealing member 18 retained by lugs 19 on the bowl.

In the use of the milk claw, the four teat cups are connected to respective inlet nozzles 12, as previously described; and discharge nozzle 14 is connected to a milk hose leading to a source of vacuum (not shown). In preparing for the milk operation, valve 16 is raised from its seat so that collecting chamber 13 is subjected to the vacuum necessary to draw milk from the teat cups. As the milk level rises in chamber 13, float valve 16 is maintained in its raised position (FIG. 3) by its buoyancy. Thereafter, an excessive milk level in the claw is prevented by the flow of milk under vacuum through the discharge nozzle 14 to the desired destination. When the milk level descends sufficiently in the claw, valve 16 is reseated so as to close off the vacuum line leading from discharge nozzle 14.

Due to the above-described arrangement of the inlet nozzles 12, the streams of milk entering the claw are directed downwardly and tangentially in one direction relative to the central vertical axis X—X of the collecting chamber 13. As a result, the milk is caused to spin in that one direction about the chamber axis (counterclockwise in FIG. 1) as the milk descends in a spiral path in chamber 13. The discharge nozzle 14 has its opening 14a in the path of the spinning milk and discharges the milk tangentially in the direction of the spin.

The dynamic energy of the spinning milk flow in the claw increases the discharge efficiency of the outlet nozzle 14. Moreover, with the tangential arrangement of inlet nozzles 12, the milk is led into the claw and discharged into nozzle 14 with the least possible amount of turbulence and splashing. Thus, the new claw not only reduces the previously mentioned aerosol effect but also provides a larger throughflow capacity as compared to prior claws of the same size.

It should be noted that the angle A is not critical but must be an acute angle (less than 90° and greater than 0°). Also, the axes of diametrically opposed inlet nozzles 12 do not have to lie in parallel vertical planes, as previously described; and the axes of nozzles 12 can be oriented more or less tangentially than as shown in FIG. 1.

It should also be noted that the inlet nozzles 12 do not have to protrude from the upper portion or cover 12 of the hollow body of the milk claw. Instead, the inlet nozzles may protrude from the side wall of the lower or bowl portion 10 of the hollow body. Even in the latter case, the tangential arrangement of these nozzles causes the milk to spin in one direction around the central vertical axis of the hollow body as the milk descends toward the tangentially directed discharge nozzle 14.

I claim:

1. A milk claw comprising a hollow body forming a milk collecting chamber having a central vertical axis, said body having upper and lower portions, four inlet nozzles protruding from said hollow body and opening into said chamber at regions spaced around said axis, the nozzles slanting downwardly toward said body at an acute angle to the horizontal while extending tangentially in one and the same direction relative to said axis, said nozzles being positioned to cause milk entering the chamber from the nozzles to spin in said one direction about said axis as the milk descends in a spiral path in the chamber, and a discharge nozzle protruding from the lower portion of said body and opening into said chamber at a region located in the spiral path of the spinning milk, the discharge nozzle extending from said chamber tangentially in said one direction relative to said axis, whereby the discharge nozzle discharges the milk tangentially from said chamber in the direction of said spin.

2. The claw of claim 1, in which said acute angle is about 45°.

3. The claw of claim 1, in which said inlet nozzles are located symetrically around said axis, diametrically opposed inlet nozzles having axes located in respective vertical planes which are substantially parallel to each other.

4. The claw of claim 1, in which said lower portion of the hollow body is a bowl, said upper portion being a cover removably secured to the bowl.

5. The claw of claim 4, in which said inlet nozzles protrude from said cover.

* * * * *